United States Patent Office

3,348,906
Patented Oct. 24, 1967

3,348,906
SOLVENT EXTRACTION PROCESS FOR THE
RECOVERY OF VANADIUM VALUES
Angus V. Henrickson, Golden, and Wayne C. Hazen,
Wheatridge, Colo., assignors to Kerr-McGee Corporation, a corporation of Delaware
No Drawing. Filed Dec. 7, 1962, Ser. No. 242,940
8 Claims. (Cl. 23—22)

ABSTRACT OF THE DISCLOSURE

A water immiscible organic solvent extractant contaminated with ferric iron is treated by an improved process wherein the absorbed iron may be removed more completely with an aqueous stripping solution in a reductive stripping step.

This invention relates to an improved process for removing absorbed iron from organic solvent extractants for desired metal values. In one of its more specific aspects, the invention relates to the recovery of vanadium values from aqueous solution by solvent extraction with an organo-phosphorus extractant by a process in which absorbed iron contaminating the solvent extractant may be removed more completely in the stripping step.

One prior art method of treating vanadium ores is leaching with aqueous sulfuric acid to thereby provide an acidic leach liquor. This method may be used for vanadium-containing ores having other substances as a main constituent, including carnotite uranium ores. The uranium may be recovered from the leach liquor with ion exchange materials and the resultant uranium barren acid leach liquor contains varying amounts of substances including iron and aluminum together with the vanadium.

Solvent extraction processes for the recovery of vanadium from aqueous acid solutions have been developed in recent years. Satisfactory solvent extractants for vanadium include organo-phosphorus compounds which may be dissolved in a suitable water immiscible, organic miscible solvent. The extractant is intimately contacted with an aqueous solution of vanadium values to thereby absorb or extract the vanadium values and largely reject undesirable associated impurities.

Iron is an especially undesirable contaminant when present in the aqueous solution in the ferric state as it is strongly extracted by organo-phosphorus extractants. For example, ferric iron is very strongly extracted by the extraction solvent and interferes with a uranium or vanadium extraction step since it lowers the effective solvent strength thereby reducing the capacity of a given amount of solvent. Extraction of ferric iron also interferes with complete regeneration of the extraction solvent and the ferric iron content tends to build up to undesirable levels. It is therefore important that maximum ferric iron rejection be achieved in the solvent extraction circuit.

In stripping uranium from a loaded extractant with aqueous soda ash, the absorbed iron is also stripped and the extractant is satisfactorily regenerated for recycle. Stripping of vanadium usually is carried out with warm 10–20% sulfuric acid and unfortunately this does not strip the ferric ion completely. Ferric ion slowly builds up in the solvent and the solvent is less capable of extracting a maximum amount of vanadium. Therefore, the capacity of the solvent for vanadium is reduced due to the ferric ion content and the "effective strength" of the solvent is no longer the actual strength of the solvent. A solvent of low effective strength due to ferric ion poisoning may leave high vanadium values in the raffinate, cause excess iron in the acid stripping solution, and contaminate the vanadium oxide product precipitated from such a vanadium liquor.

The popular method of recovering vanadium by solvent extraction with di-2-ethylhexyl phosphoric acid is especially subject to interference by ferric iron. The ferric iron is strongly extracted from the vanadium-pregnant leach liquor and poorly stripped from the loaded solvent extractant by the hot 10–20% sulfuric acid usually used to strip the vanadium. Thus, normally there is a gradual build-up of ferric iron which "poisons" the solvent insofar as vanadium extraction is concerned. Even though no ferric iron is present initially in the vanadium-pregnant leach liquor to be extracted, apparently some oxidation by air occurs during the solvent extraction step so that ferrous iron which is always present as a contaminant is oxidized to ferric iron and then strongly extracted or held by the solvent extractant.

The control of the ferric iron level in solvent extraction has been a difficult problem which has long existed in this art. However, prior to the present invention there has been no entirely acceptable process for effectively stripping the absorbed ferric iron from a solvent extractant without using uneconomic quantities of stripping solution, or resorting to a special treatment such as with caustic which is designed to remove ferric iron after recovery of the desired metal values by normal stripping techniques. Thus, the art has long sought a process by which the ferric iron can be removed by normal stripping at the rate it tends to build up in the solvent extractant, and thereby allow the solvent extractant to be regenerated effectively for recycle in the process.

The process described herein for removing absorbed iron from a poisoned solvent extractant is especially useful in continuous solvent extraction processes for the recovery of desired metal values in which the solvent extractant normally is recycled in the process over many cycles. The present invention enables the solvent extractant to be rejuvenated more completely, and thereby greatly increases the effective solvent strength due to its greater capacity for the desired metal values. This in turn increases the efficiency of the over-all extraction process.

It is an object of the present invention to provide an improved process for removing absorbed iron from a substantially water immiscible organic solvent extractant for desired metal values.

It is a further object to provide an improved process for solvent extracting desired metal values from their aqueous solution whereby contamination of the extraction solvent with ferric iron may be overcome without resorting to an involved treatment.

It is still a further object to provide an improved process for removing absorbed ferric iron from di-2-ethylhexyl phosphoric acid, and for extracting vanadium from its aqueous solutions employing di-2-ethylhexyl phosphoric acid as the solvent extractant.

Still other objects and advantages of the invention will be apparent to those skilled in the art upon reference to the following detailed description and the examples.

The present invention will be described and illustrated hereinafter with specific reference to the solvent extraction of vanadium in the plus 4 oxidation state from aqueous solutions containing the same and dissolved iron. However, it will be recognized that the invention may be practiced in the recovery of other metal values from aqueous solution when utilizing solvent extractants in general, and especially the organo-phosphorus compounds defined herein.

In practicing the prior art process, a solution of an organo-phosphorus extractant in a water immiscible inert organic carrier is first prepared. The diluent to be used should meet certain requirements such as immiscibility with the aqueous solution, an ability to dissolve the organo-phosphorus compound and the extracted metal complex, freedom from interfering reaction with the organo-phosphorus compound, and a density allowing ready separation from the aqueous phase. Examples of suitable inert carriers are hydrocarbons such as benzene, toluene, cyclohexane, hexane or octane, paraffinic or aromatic hydrocarbon distillates such as light or heavy naphthas, and chlorinated solvents such as carbon tetrachloride or perchloroethylene. The preferred inert carrier for economic reasons is high flash point kerosene or other suitable petroleum distillates boiling within the kerosene range.

A wide variety of organo-phosphorus compounds which are known to be satisfactory for extracting uranium, vanadium, copper, zinc or other desired metal values from their aqueous solutions may be used in practicing the present invention. Examples of organo-phosphorus compounds include mono-organo phosphoric acid esters of the general formula

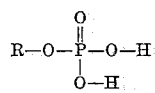

diorgano phosphoric acid esters of the general formula

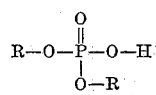

organo pyrophosphates of the general formula

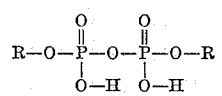

organo phosphonic acids of the general formula

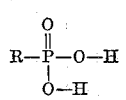

and diorgano phosphinic acids of the general formula

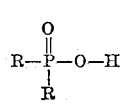

where R is a monovalent organic radical selected from the group consisting of alkyl radicals, cycloalkyl radicals, aryl radicals and aralkyl radicals. The organo phosphorus compound should contain at least 8 carbon atoms and usually for better results 16 to 20 carbon atoms. Preferably, the organo radicals should contain at least 6 carbon atoms and for best results at least 8 carbon atoms, but often up to 12–16 or 20 carbon atoms are satisfactory.

The concentration of the organo phosphorus compound in the inert carrier may vary over a considerable range. For example, the extraction solution may contain 1–30% by weight of the organo phosphorus compound with the remainder being water immiscible inert organic carrier. If desired, more than one organo phosphorus compound may be present, or promoters or synergistic agents may be added to the solution. In some instances, higher percentages of the organo phosphorus compound may be used such as up to 50% by weight or higher. However, this is not usually desirable.

The extractant is intimately contacted with the aqueous solution containing the desired metal values and ferrous ion as an impurity to produce a loaded extractant. The loaded extractant containing absorbed iron is then separated from the aqueous solution and intimately contacted with a stripping agent to recover the desired metal values therefrom, and the stripped extractant recycled in the process.

When extracting vanadium from an acid leach liquor containing vanadium values in the plus 4 oxidation state, it is preferred that the extractant be a kerosene solution of di-2-ethylhexyl phosphoric acid. Usually a concentration of about 8–12%, and preferably about 10% is used. The extractant is contacted with the aqueous solution of vanadium values at a pH of 1.4 to 3.0 after first reducing the ferric ion content to the ferrous state. The ferric ion may be reduced by contacting the solution with metallic iron, by addition of sulfur dioxide in the presence of activated carbon or a water soluble thiocyanate such as described in U.S. Patent 2,959,462, or by other methods well known to the art which assure that substantially no ferric ion remains in the solution.

The water immiscible solvent extractant is brought into intimate contact with the acidic vanadium-bearing leach liquor by any suitable means such as in a countercurrent extraction unit and for such period of time as is necessary to effect extraction of the vanadium content. Some iron is also extracted. A pH value for the leach liquor between 1.4 and 3.0 has been found to be very satisfactory, but even better results may be obtained when the pH value is between about 1.5 and 1.8.

The extraction step may be carried out at a temperature of about 90–120° F. in instances where there is a pronounced tendency toward emulsion formation. However, the temperature should not be sufficiently elevated to cause a substantial amount of hydrolysis of the di-2-ethylhexyl phosphoric acid.

After the extractant has been contacted with the aqueous solution for a period of time sufficient to extract the vanadium content, the resultant vanadium loaded extractant is separated. The vanadium content of the loaded extractant may be recovered by stripping with about 10–20% aqueous sulfuric acid or other satisfactory mineral acid. The stripped extractant still containing iron may be separated from the stripping solution and recycled to extract additional vanadium but the effective strength is reduced markedly with continued operation. A commercial grade of vanadium may be obtained from the mineral acid strip solution by various well known methods. One method comprises oxidizing the tetravalent vanadium content of the mineral acid strip solution to pentavalent vanadium with an oxidizing agent such as sodium chlorate, and then adjusting the acid strength to effect precipitation of the vanadium as the oxide ($V_2O_5$). Other methods of obtaining vanadium concentrates are known and the specific method employed does not comprise a part of this invention.

In accordance with one variant of the present invention, in the stripping step discussed above the iron containing solvent extractant is contacted with an aqueous stripping solution to thereby produce an aqueous solution containing desorbed ferric iron, which is contacted with a reducing agent whereby the ferric iron is reduced to a lower valence state. Thereafter, the stripping solution containing the reduced iron may be again contacted with the loaded extractant to strip additional absorbed ferric iron. Thus, it is possible to use a smaller volume of aqueous strip solution for the recovery of the desired metal values and produce a more concentrated stripping solution and still regenerate the solvent completely with respect to absorbed iron.

The build-up of iron in the extraction solvent may be controlled by maintaining reducing conditions in the stripping circuit so that the ferric iron which is stripped from the loaded extraction solvent is rapidly reduced to ferrous iron. This increases the stripping coefficient markedly so that the equilibrium level of iron in the solvent extractant is reduced to a very low level. As a general rule, the nature of the solvent extractant, its method of contact with the aqueous solution containing desired metal values, and the stripping of the desired metal values from the loaded extractant may be in accordance with the prior art with the exception of maintaining reducing conditions in the stripping circuit.

Any satisfactory reducing agent capable of reducing ferric iron to ferrous iron in the stripping solution employed may be used in practicing the present invention. For instance, when the stripping solution is an aqueous mineral acid such as 10–20% sulfuric acid, the reducing agent may be sulfur dioxide, zinc amalgam, stannous chloride, etc. Electrolytic reduction also may be used. The most effective method of reducing the ferric ion to ferrous ion is by addition of a water soluble substance providing sulfite ion in the presence of a catalyst such as activated carbon or charcoal, or a water soluble substance providing thiocyanate ion. Examples of water soluble substances providing sulfite ion include ammonium sulfite, alkali metal sulfites such as sodium and potassium, and sulfur dioxide (sulfurous acid). In instances where the catalyst is thiocyanate ion, it may be supplied to the strip solution by addition by catalytic amounts of a water soluble thiocyanate such as ammonium, sodium or potassium thiocyanate.

In instances where sulfur dioxide is used as the reducing agent, it is preferred that it be added to the stripping solution to be reduced, and then the stripping solution and the sulfur dioxide are passed through a bed of activated carbon catalyst cocurrently. This has been found to result in substantially higher efficiencies than when countercurrent practices are employed. The reducing agent is added in quantities sufficient to achieve the desired degree of reduction of ferric iron to ferrous iron. In instances where sulfur dioxide is employed as the reducing agent, at least a slight excess is preferred so as to provide a detectable amount in the aqueous solution after reduction.

In most instances, it is preferred that the stripping solution be contacted with the loaded solvent extractant in a plurality of stripping stages. The stripping solution may be subjected to reducing conditions following one or more of the stripping stages whereby the ferric iron content is reduced to ferrous iron, and then the stripping solution is ready for desorbing additional quantities of ferric iron in the next stripping stage.

The present invention is effective in reducing the equilibrium level of iron in a solvent extractant utilized in a continuous extraction circuit to low levels such as 0.1–0.5 gram per liter. At the same time, it is possible to raise the effective strength of the solvent extractant over that normally existing in the extraction circuit by a substantial margin. In many instances it is possible to increase the effective strength by 25%–50%.

The process of the invention may be used for the rejuvenation of an iron-poisoned extraction solvent following recovery of desired metal values therefrom. The stripped extraction solvent may be contacted in a separate stripping step with another portion of a stripping agent under reducing conditions to thereby quickly and efficiently strip the iron content.

The extraction solvent may be contacted with the stripping solution under reducing conditions for a period of time sufficient to desorb the iron to a desired level or until equilibrium conditions are reached. Normally, at equilibrium conditions the iron content is less than 0.5 gram per liter of extraction solvent, as compared with an average of about 1.5–2.0 grams of iron per liter in prior art operations. Increasing the temperature of the stripping solution lowers the equilibrium level of iron substantially. Better results are obtained when the stripping is conducted at a temperature above 100° F., and preferably from 125° F. up to the boiling point of the stripping solution. Stripping temperatures of 140° F. to 165° F. are very effective.

The present invention is especially useful in the extraction of vanadium from its aqueous solutions. However, other heavy metal values may be recovered. Suitable conditions for the recovery of vanadium, uranium, copper and zinc from leach liquors are well known and disclosed in U.S. Patent 2,864,668, U.S. Patent 2,992,894 and copending application Ser. No. 610,715, filed Sept. 19, 1956, now Patent No. 3,151,933, by Wayne C. Hazen and Angus V. Henrickson. Extraction apparatus suitable for liquid-liquid contacting of the leach liquor, stripping solution and extractant is likewise well known, such as that disclosed in application Ser. No. 707,368, filed Jan. 6, 1958, now abandoned, by Wayne C. Hazen and Robert L. Cline.

The foregoing detailed description and the following specific examples are for purposes of illustration only, and are not intended as being limiting to the spirit or scope of the appended claims.

*Example I*

A leach liquor containing vanadium in the tetravalent oxidation state was prepared by conventional hydrometallurgical procedures from a vanadium-bearing ore. The leach liquor was found to contain an average of about 3.1 g./l. of vanadium values calculated as $V_2O_5$, about 3.33 g./l. of iron, and other usual impurities such as phosphorus, aluminum, titanium and trace metals. The pH value of the liquor was about 2.

The above vanadium-bearing leach liquor was extracted in a liquid-liquid extraction apparatus with a kerosene solution containing about 10% of di-2-ethylhexyl phosphoric acid. The temperature of the leach liquor and extraction solution was maintained within an operating range of 90–120° F.

The vanadium-barren leach liquor from the extraction unit was sent to tailings, and the vanadium-loaded extractant was transferred to a stripping section for vanadium stripping. The vanadium content of the loaded extractant was recovered in the stripping section by intimate contact with 10–20% aqueous sulfuric acid. The loaded extractant and aqueous sulfuric acid were agitated vigorously until equilibrium was reached, at which time the solvent contained 1.67 grams of iron per liter, and the aqueous sulfuric acid contained 3.91 grams of iron per liter.

It was impossible to reduce the iron content of the extraction solvent below 1.67 grams of iron per liter with continued contact with the stripping solution. However, when a portion of the stripping solution was withdrawn, the ferric iron content reduced by adding sulfur dioxide gas and passing through an activated charcoal bed catalyst, and the reduced stripping solution cycled to the mixer, a very marked further reduction in the iron content of the extraction solvent was noted. For instance, at the end of 1½ hours of operating in this manner, the iron content of the extraction solvent dropped from 1.67 grams of iron per liter to only 0.50 gram of iron per liter.

The stripping solution and the extraction solvent were maintained at a temperature of about 125° F. during stripping.

Example II

A vanadium-loaded solvent extractant was prepared as in Example I, and then stripped with different strengths of aqueous sulfuric acid following the reductive stripping procedure of Example I. The reducing agent was sulfur dioxide in the presence of activated carbon as a catalyst. The stripping solutions were 3.5% aqueous sulfuric acid and 9.3% aqueous sulfuric acid.

Samples of the solvent extractant were taken after various periods of time and analyzed for iron content during runs for each of the aqueous sulfuric acid solutions. The data thus obtained appear in the following table:

TABLE I

| 3.5% Aqueous $H_2SO_4$ | | 9.3% Aqueous $H_2SO_4$ | |
|---|---|---|---|
| Expired Time (min.) | Grams Fe/l. in Extraction Solvent | Expired Time (min.) | Grams Fe/l. in Extraction Solvent |
| 0 | 1.26 | 0 | 1.26 |
| 30 | 1.12 | 20 | 0.95 |
| 45 | 1.03 | 40 | 0.75 |
| 60 | 0.98 | 70 | 0.48 |
| 75 | 0.87 | 100 | 0.34 |
| 140 | 0.50 | 145 | 0.17 |
| 320 | 0.14 | 205 | 0.03 |

Example III

A continuous flow laboratory scale solvent extraction unit was used in this example. This unit consisted of five stages of liquid-liquid extraction and four stages for stripping the resultant loaded extractant.

The solvent extractant and the vanadium-bearing solution to be extracted were the same as noted in Example I. The stripping solution was 15% aqueous sulfuric acid at 125° F.

The results of analyses made on extraction solvent without reductive stripping and with reductive stripping where the ferric iron content of the stripping solution was reduced between stripping stages are given in the following table. Reduction was effected with sulfur dioxide in the presence of activated carbon as a catalyst.

TABLE II

| Stripping Stage | Without Reductive Stripping, grams Fe/l. in Extraction Solvent | With Reductive Stripping, grams Fe/l. in Extraction Solvent |
|---|---|---|
| 1 | 1.58 | 0.72 |
| 2 | 1.57 | 0.68 |
| 3 | 1.49 | 0.57 |
| 4 | 1.44 | 0.43 |

From the above data, it is apparent that without reductive stripping it was impossible to reduce the iron content of the solvent below 1.44 grams of iron per litter. However, under identical stripping conditions with the exception of reductive stripping, the iron content was reduced to 0.43 gram of iron per liter. This remarkable reduction in iron content of the extraction solvent is due to the reductive stripping.

The effective strength of the extraction solvent at the equilibrium level of iron without reductive stripping was 6.0, and with reductive stripping it was 8.2. Thus, reductive stripping resulted in more than a one-third increase in the effective strength of the extraction solvent.

A number of runs using reductive stripping were conducted with the strip solution being at varying temperatures. It was found that decreasing the temperature of the strip solution resulted in an increase in the iron content of the extraction solvent, while increasing the temperature of the strip solution resulted in a marked decrease in the iron content. For example, in one series of runs the iron content of the stripped extractant was 0.79 gram per liter when stripped at 95° F., 0.31 gram per liter when stripped at 125° F. and only 0.13 gram per liter when stripped at 140° F. Similar stripping conditions were maintained throughout these determinations. It is therefore obvious that temperatures of at least 125° F., and preferably 140° F. or higher are very desirable and result in a marked benefit.

What is claimed is:

1. In a process for the recovery of vanadium values including the steps of intimately contacting an aqueous solution containing vanadium values to be recovered and contaminating iron values with a substantially water immiscible organic solvent extractant to produce a loaded solvent extractant phase containing absorbed vanadium values and iron, at least a portion of the absorbed iron being in the ferric oxidation state, separating the resulting loaded solvent extractant phase from the aqueous solution, intimately contacting the separated loaded solvent extractant phase with a 10 to 20% sulfuric acid stripping solution for the absorbed vanadium values and at least a portion of the absorbed ferric iron to produce an aqueous stripping solution containing desorbed vanadium values and ferric iron, thereafter separating the stripping solution from the extractant phase and recovering the vanadium values therefrom, the improvement comprising intimately contacting the stripping solution containing the desorbed ferric iron with a reducing agent therefor whereby ferric iron is reduced to the ferrous state, thereafter intimately contacting the solvent extractant phase with the stripping solution to strip additional absorbed iron therefrom, separating the stripping solution from the solvent extractant phase, and then intimately contacting additional aqueous solution containing vanadium values to be recovered with the separated solvent extractant phase.

2. The process of claim 1 wherein the extractant is a solution in a substantially water immiscible inert organic liquid carrier of at least one organo-phosphorus compound selected from the group consisting of mono-organo phosphoric acid esters of the general formula

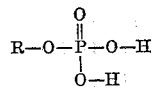

diorgano phosphoric acid esters of the general formula

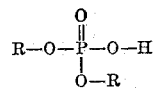

organo pyrophosphates of the general formula

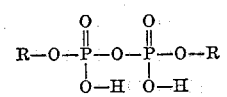

organo phosphonic acids of the general formula

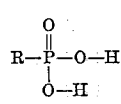

and diorgano phosphinic acids of the general formula

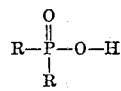

where R is a monovalent organic radical selected from the group consisting of alkyl radicals, cycloalkyl radicals, aryl radicals and aralkyl radicals and the organo-phosphorus compound contains at least 8 carbon atoms.

3. The process of claim 2 wherein the organo-phosphorus compound is a dialkyl phosphoric acid ester.

4. The process of claim 1 wherein the vanadium values to be recovered include tetravalent vanadium values and the organo-phosphorus compound is di-2-ethylhexyl phosphoric acid.

5. The process of claim 4 wherein the ferric iron is reduced to the ferrous state by means of a water soluble substance providing sulfite ion in aqueous solution.

6. The process of claim 4 wherein the stripping solution containing the desorbed ferric iron is contacted with a metal selected from the group consisting of metallic iron and metallic aluminum to thereby reduce the ferric iron to the ferrous state.

7. The process of claim 4 wherein the stripping solution is aqueous 10–20% sulfuric acid and the ferric iron is reduced to the ferrous state by means of a water soluble substance providing sulfite ion in aqueous solution.

8. The process of claim 4 wherein the stripping solution is aqueous sulfuric acid, the ferric iron is reduced to the ferrous state by addition of sulfur dioxide to the stripping solution containing the desorbed ferric iron in the presence of a catalyst selected from the group consisting of activated charcoal and a water soluble substance providing thiocyanate ion in aqueous solution, and the stripping solution has a temperature between about 120° F. and less than the boiling point.

References Cited
UNITED STATES PATENTS

| | | | |
|---|---|---|---|
| 2,959,462 | 11/1960 | Goren | 23—23 X |
| 3,131,993 | 5/1964 | Gustison et al. | 23—23 X |
| 3,145,081 | 8/1964 | Surls et al. | 23—22 X |
| 3,151,933 | 10/1964 | Hazen et al. | 23—23 X |

OSCAR R. VERTIZ, *Primary Examiner.*

H. T. CARTER, *Assistant Examiner.*